United States Patent [19]

Bell

[11] 4,073,463
[45] Feb. 14, 1978

[54] SPROCKET MOLD

[76] Inventor: Richard M. Bell, Wells Hill Road, Lakeville, Conn. 06039

[21] Appl. No.: 697,911

[22] Filed: June 21, 1976

[51] Int. Cl.² .............................................. B29D 15/00
[52] U.S. Cl. .................................... 249/102; 249/161
[58] Field of Search ............... 249/102, 155, 156, 158, 249/159, 161, 162, 168; 164/112, 139, 339, 340, 346, 368; 199/94

[56] References Cited

U.S. PATENT DOCUMENTS

| 337,764 | 3/1886 | Gulliver | 249/161 X |
| 3,433,292 | 3/1969 | McDonald | 164/346 X |

*Primary Examiner*—Francis S. Husar
*Assistant Examiner*—John S. Brown

[57] ABSTRACT

A sprocket mold system is provided for inexpensive molding of a number of different diameter sprockets each having an idential sprocket tooth size. Each tooth is formed between a pair of tooth-defining elements having accurately curved surfaces, these elements being accurately positioned in a mold insert of the desired diameter. Different mold inserts are provided for different numbers of sprocket teeth to give different diameters of final molded sprockets. A modification of the invention is adapted to the manufacture of gears. While the principles of gear design preclude the use of the same tooth-defining elements for gears of different diameters the method of forming and mounting the tooth-defining elements provides extreme accuracy of tooth molding.

9 Claims, 4 Drawing Figures

SPROCKET MOLD

BACKGROUND OF THE INVENTION

In the production of plastic conveyors, drive chains and the like, particularly for systems where cleanliness and freedom from lubrication is required (such as in the handling of food products) it is highly desirable to manufacture the moving parts from plastic. However molding of plastic parts generally requires expensive molds which have utility for making only one single part. While mold inserts have been used to change certain features in molded pieces, as far as is known, the molding of sprockets has always required intricately designed molds which constitute a mirror image of the sprocket tooth shape, there being a separate mold required for each different sprocket diameter.

PRIOR ART

The most pertinent art known to applicant is embodied in several ancient U.S. Pat. Nos. 351,784 Nov. 2, 1886 and 619,926 Feb. 21, 1899 showing molds for cylindrical objects wherein the mold includes radially extending pieces whose inner ends define the circumference of the object being molded. By changing the number of pieces used in the molds shown in these old patents the interior mold diameter can be changed. U.S. Pat. No. 2,538,368 of Jan. 16, 1951 shows a gear mold in which there are circumferentially positioned a number of segments, each of which defines a plurality of teeth on a single gear. These segments are mounted for radial outward movement to permit easy removal of the formed gear.

SUMMARY OF THE INVENTION

A mold system is provided which permits the molding of a toothed power transmission element such as a gear or sprocket. For convenience, the invention will first be described in connection with a preferred form which permits the molding of sprockets of a given pitch but with widely varying diameters with extreme accuracy of sprocket tooth shape and with a low cost per mold. This is achieved by providing tooth-defining elements which can be machine ground to the requisite degree of accuracy and which are supported in mold inserts to provide the desired number of teeth. Thus for example with a single pitch specification, the number of teeth in the sprocket can vary from fewer than 19 to 35 or more. While the same identical tooth-defining elements are utilized for making two different size sprockets there will obviously, in the larger sprocket, be a corresponding increase in the number of tooth-defining elements utilized.

In order that the invention may be more readily understood reference should be had to the preferred embodiment thereof as illustrated in the accompanying drawings wherein.

Figure 1:
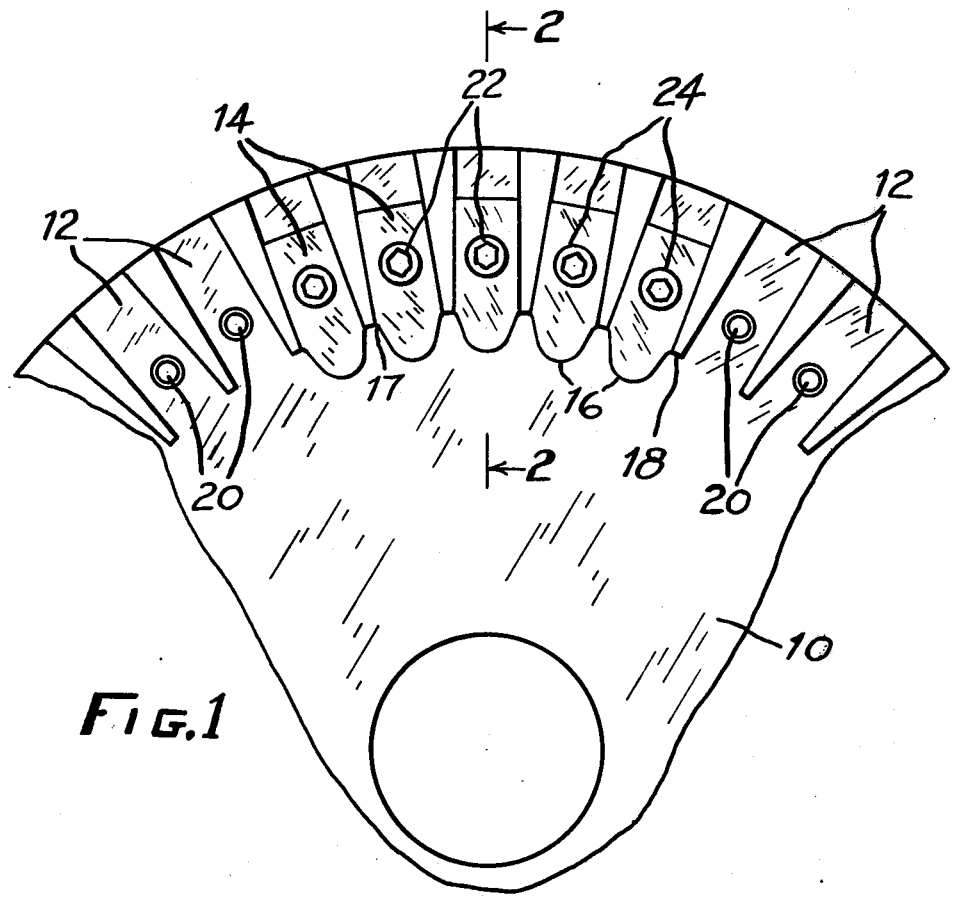
FIG. 1 is a diagramatic schematic plan view of a portion of a mold embodying the invention.

Referring now to FIG. 1 there is shown a plan view of a mold insert designed for a 100 pitch sprocket having 35 teeth designed to operate with a roller link diameter of 0.312 inch. The mold insert is shown as a flat ring 10 having radially extending machined slots 12, each slot being adapted to hold a tooth-defining element 14.

Each tooth-defining element 14 has an accurately shaped surface 16 which extends inwardly of the inner circumference 18 of the mold insert ring 10. Accurately finished surface 16 defines the sprocket cavity, the leading face of one tooth and the trailing face of the adjacent tooth.

Figure 1A:
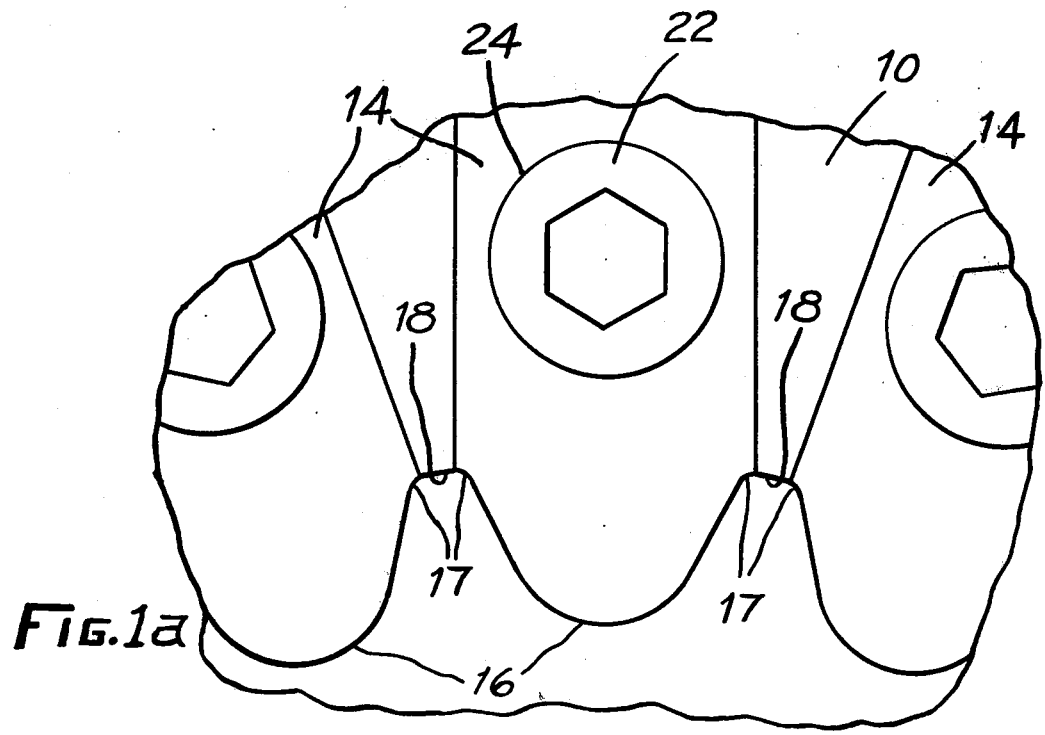
FIG. 1a is an enlarged view of a portion of FIG. 1.

In FIG. 1a there is shown an enlarged plan view of two adjacent tooth-defining elements 14 with their curved inner ends 16 which cooperate with the short circumferential surface 18 on the mold insert 10 to form a single sprocket tooth. Each tooth-defining element 14 has a shoulder which marks the transition from the lower curved end 16 to the circumferential surface 18, this shoulder being terminated at its outer end at a point of tangency with the surface 18.

Referring again to the mold insert 10 each slot 12 is seen to extend radially from the interior to the exterior with the center line of the slot passing through a dowel hole 20 which is precisely radially spaced from the center of the mold insert 10. This is adapted to receive a dowel 22 which extends through an accurately machined hole 24 in the tooth-defining element 14.

Figure 2:
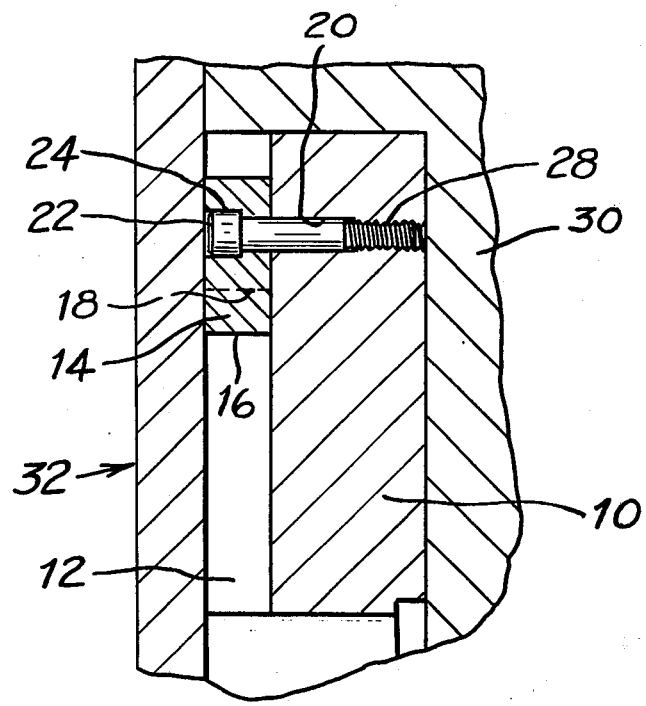
FIG. 2 is a sectional view along the line 2—2 of FIG. 1.

Referring now to FIG. 2 (which is a section made along the line 2—2 of FIG. 1) there is shown a portion of a section of an assembled mold insert in a mold cavity ready to receive a charge of plastic. The mold insert 10 is shown as carrying on its top surface the tooth-defining element 14 having the inner curved surface 16. The dowel screw 22 extends through the hole 24 in element 14 into the dowel hole 20 where it is secured by a screw thread 28, thus accurately holding the element 14 in the desired predetermined location. The remainder of the mold is made up by the bottom plate 30 and top plate 32 to complete the cavity into which the plastic for molding the sprocket is placed (for example by injection). For simplicity of illustration the other elements 14, with their tips 16 are not shown in FIG. 2.

Figure 3:
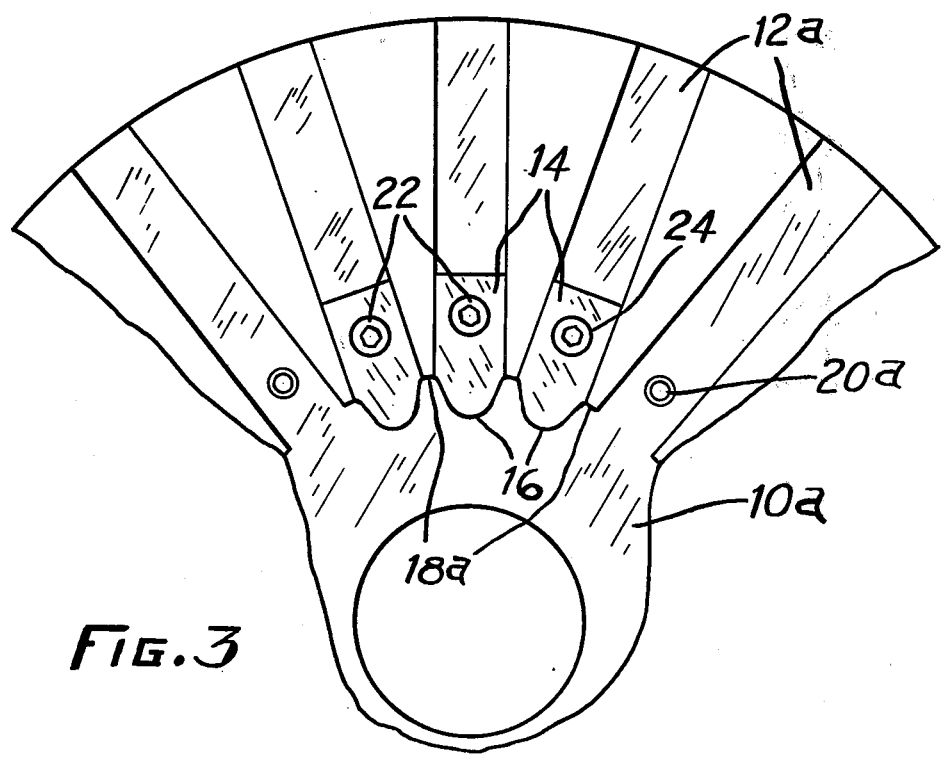
FIG. 3 is a diagramatic schematic plan view of a portion of a mold similar to FIG. 1 but showing the same tooth-defining elements used to make a smaller sprocket.

In FIG. 3 there is shown a different mold insert 10a having longer slots 12a for holding the identical tooth-defining elements 14 utilized in FIG. 1. It can be seen that the holes 20a for positioning the tooth-defining elements are positioned the same distance from the end of the slots 12a as is the case in FIG. 1. Also the arcuate distance 18a which, defines the tooth tip, is the same in FIG. 3 as it is in FIG. 1. However, the angle between the slots in FIG. 3 is greater than that in FIG. 1. This is necessary to accommodate the fewer number of teeth on the circumference of the molded sprocket. The tooth shape produced with the FIG. 3 mold insert 10a will be exactly the same as the tooth shape produced with the mold insert 10 of FIG. 1 even though the diameters of the resulting sprockets will be substantially different, as will be the number of teeth on each sprocket.

While a preferred embodiment of the invention has been described wherein mold insert plates, having precisely machined slots, are provided for accurately positioning each tooth-defining element, other forms of the invention can be utilized. For example, instead of machining accurate slots, separate wedge shaped inserts can be provided for defining the inner circumference 18 between the tooth-defining elements 14. These wedge shaped inserts would be accurately machined and accurately held on the mold insert by means such as additional dowel pins. While dowel pins are a preferred method of positioning, due to the ease of precise drilling of dowel holes on a jig borer, other positioning means such as accurately machined cooperating shoulders and the like can be employed.

An important feature of the invention is the fact that the positioning on the tooth-defining element (whether a hole, shoulder or the like) can be utilized for holding the tooth element in the tool which is used to accurately grind the tooth-defining shape. Therefore when this hole, for example, is aligned with an accurately positioned hole in the mold insert the tooth-defining surface 16 must be accurately positioned.

The sprockets produced by the present invention can be utilized for a number of applications such as chain drives, for driving or supporting conveyors such as the type as shown in U.S. Pat. Nos. 3,237,755 and 3,774,752 or in conjunction with timing belts of the type shown in U.S. Pat. No. 3,756,091.

As mentioned previously, the invention can also be used for the manufacture of gears as well as sprockets although the same tooth-defining elements cannot be used (in general) for making gears of different diameters. However, the basic feature of having separate tooth-defining elements which can be accurately form ground outside of the mold and then accurately positioned within a mold insert provides for the inexpensive production of a gear mold of extremely accuracy and surface finish without the necessity of utilizing electric discharge machining and the like. In manufacturing a gear mold each tooth-defining elements 14 is ground to the mirror image of a desired gear tooth cavity and the space 18 between the tooth-defining elements is shaped to form the gear tip. Identical positioning holes and dowels can be used to assemble the elements 14.

I claim:

1. A molding system for molding a plurality of different sprockets for operating with a predetermined link diameter, means defining a mold cavity, a plurality of tooth-defining elements adapted to be inserted in the mold cavity, each tooth-defining element having a curved inner end defining the tooth cavity and sides defining the tooth sides, each element side terminating in a shoulder which is tangent to the sprocket tooth outside circumference, a plurality of mold insert plates, each plate being designed to give a different sprocket diameter, each plate having a plurality of element-positioning slots, the number of slots in each plate being different but the arcuate spacing between the inner ends of adjacent slots being identical, a positioning surface associated with each slot, each surface being radially spaced an equal amount from the center of the mold plate.

2. A molding system for molding a plurality of different diameter sprockets for operating with a predetermined link diameter, means defining a mold cavity, a plurality of sprocket tooth-defining elements adapted to be inserted in the mold cavity, each element having an accurately finished surface which defines the sprocket cavity and the leading face of one tooth and the trailing face of the adjacent tooth, means for accurately positioning each said element with respect to the axis and circumference of the mold cavity, means associated with said positioning means for defining that portion of each sprocket tooth tip which is not defined by a cooperating pair of tooth-defining elements, there being a plurality of positioning means for making a plurality of different diameter sprockets, each different positioning means holding the tooth-defining elements with the mold cavity at the same predetermined angle with respect to each element held thereby and with the same arcuate spacing being the inner ends of the elements, the angles being different with different positioning means but the arcuate spacing being the same in each of the different positioning means.

3. A molding system for molding a sprocket for operating with a predetermined link diameter, means defining a mold cavity, a plurality of sprocket tooth-defining elements adapted to be inserted in the mold cavity, each element having an accurately finished surface which defines the sprocket cavity and the leading face of one tooth and the trailing face of the adjacent tooth, means for accurately positioning each of said element with respect to the axis and circumference of the mold cavity, means associated with said positioning means for defining that portion of each sprocket tooth tip which is not defined by a cooperating pair of tooth-defining elements, the positioning means comprising a mold insert plate having radially extending slots therein and positioning stops associated with each slot which are a predetermined radial distance from the center of said mold plate.

4. The molding system of claim 3 wherein the slots have walls parallel to a radius extending down the center of the slot.

5. The molding system of claim 3 wherein there is a hole through each tooth-defining element, a hole in each slot and a pin maintains said holes in alignment.

6. The molding system of claim 3 wherein the center line of the tooth-defining element corresponds with the base of the tooth cavity (e.g. the bottom diameter of the sprocket).

7. A molding system for molding a sprocket for operating with a predetermined link diameter, means defining a mold cavity, a plurality of sprocket tooth-defining elements adapted to be inserted in the mold cavity, each element having an accurately finished surface which defines the sprocket cavity and the leading face of one tooth and the trailing face of the adjacent tooth, means for accurately positioning each said element with respect to the axis and circumference of the mold cavity, means associated with said positioning means for defining that portion of each sprocket tooth tip which is not defined by a cooperating pair of tooth-defining elements, the positioning means comprising slots in a mold insert, a positioning surface associated with each slot, each surface being radially spaced an equal amount from the center of the mold insert, a positioning surface associated with each tooth defining element, each said surface being spaced an equal distance from the inner end of the element, whereby when the positioning surfaces on the elements and the slots are predeterminedly aligned the inner end of each tooth-defining element is spaced an equal radial distance from the center of the mold insert.

8. A molding system for molding a toothed power transmission element such as a gear or sprocket, means defining a mold cavity, a plurality of tooth-defining elements adapted to be inserted in the mold cavity, each element having an accurately finished surface which defines the cavity between the teeth and the leading face of one tooth and the trailing face of the adjacent tooth, means for accurately positioning each said element with respect to the axis and circumference of the mold cavity, means associated with said positioning means for defining that portion of each tooth tip which is not defined by a cooperating pair of tooth-defining elements, the positioning means comprising a mold insert plate having radially extending slots therein and positioning stops associated with each slot which are a predetermined radial distance from the center of said mold plate.

9. A molding system for molding a gear for operating with a predetermined link diameter, means defining a mold cavity, a plurality of gear tooth-defining elements adapted to be inserted in the mold cavity, each element having an accurately finished surface which defines the gear cavity and the leading face of one tooth and the trailing face of the adjacent tooth, means for accurately positioning each said element with respect to the axis and circumference of the mold cavity, means associated with said positioning means for defining that portion of each gear tooth tip which is not defined by a cooperating pair of tooth-defining elements, the positioning means comprising slots in a mold insert, a positioning surface associated with each slot, each surface being radially spaced an equal amount from the center of the mold insert, a positioning surface associated with each tooth defining element, each said surface being spaced an equal distance from the inner end of the element, whereby when the positioning surfaces on the elements and the slots are predeterminedly aligned the inner end of each tooth-defining element is spaced an equal radial distance from the center of the mold insert.

* * * * *